(12) United States Patent
Ichikawa

(10) Patent No.: US 10,391,866 B2
(45) Date of Patent: Aug. 27, 2019

(54) ELECTRICALLY-DRIVEN VEHICLE AND CONTROL METHOD FOR ELECTRICALLY-DRIVEN VEHICLE

(71) Applicant: TOYOTA JIDOSHA KABUSHIKI KAISHA, Toyota-shi, Aichi-ken (JP)

(72) Inventor: Shinji Ichikawa, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 68 days.

(21) Appl. No.: 15/849,886

(22) Filed: Dec. 21, 2017

(65) Prior Publication Data

US 2018/0178672 A1 Jun. 28, 2018

(30) Foreign Application Priority Data

Dec. 26, 2016 (JP) .................................. 2016-250854

(51) Int. Cl.
*B60L 58/13* (2019.01)
*B60L 3/12* (2006.01)
(Continued)

(52) U.S. Cl.
CPC ............... *B60L 3/12* (2013.01); *B60L 3/0023* (2013.01); *B60L 50/15* (2019.02); *B60L 50/16* (2019.02);
(Continued)

(58) Field of Classification Search
CPC .......... B60L 58/13; B60L 3/12; B60L 53/305; B60L 53/60; B60L 50/16; B60L 50/15; B60L 53/14; B60L 3/0023; B60L 2220/42; B60L 2240/44; Y04S 30/14; Y04S 30/12; Y04S 20/222; Y02T 10/6239;
(Continued)

(56) References Cited

U.S. PATENT DOCUMENTS 8,290,649 B2 * 10/2012 Iwashita ................... B60L 3/12
701/22
8,517,126 B2 * 8/2013 Atarashi ................ B60L 5/005
180/2.1
(Continued)

FOREIGN PATENT DOCUMENTS

| JP | 2008-100646 A | 5/2008 |
| JP | 2008-121621 A | 5/2008 |
| JP | 2013-41324 A | 2/2013 |

*Primary Examiner* — M Baye Diao
(74) *Attorney, Agent, or Firm* — Sughrue Mion, PLLC

(57) ABSTRACT

An electrically-driven vehicle includes: a rotary electric machine; an electric power storage device; a communication device communicable with a server on the outside of the electrically-driven vehicle; and an electronic control unit configured to control external charging in which the electric power storage device is charged by using electric power that is supplied from a power feeding device on the outside of the electrically-driven vehicle. The electronic control unit acquires information from the server, the information indicating a degree of tightness of electricity supply-demand balance at a destination of the electrically-driven vehicle, and then prohibits execution of external charging promotion control for urging a user to perform the external charging at the destination in the case where the acquired information indicates that the degree of the tightness is higher than a reference level.

6 Claims, 8 Drawing Sheets

(51) Int. Cl.
  *B60L 53/14*      (2019.01)
  *B60L 53/30*      (2019.01)
  *B60L 3/00*       (2019.01)
  *B60L 53/60*      (2019.01)
  *B60L 50/16*      (2019.01)
  *B60L 50/15*      (2019.01)

(52) U.S. Cl.
  CPC ............. *B60L 53/14* (2019.02); *B60L 53/305* (2019.02); *B60L 53/60* (2019.02); *B60L 58/13* (2019.02); *B60L 2220/42* (2013.01); *B60L 2240/44* (2013.01); *B60W 2710/244* (2013.01); *Y02B 70/3225* (2013.01); *Y02T 10/6239* (2013.01); *Y02T 10/6286* (2013.01); *Y02T 10/7005* (2013.01); *Y02T 10/7077* (2013.01); *Y02T 90/168* (2013.01); *Y02T 90/169* (2013.01); *Y04S 20/222* (2013.01); *Y04S 30/12* (2013.01); *Y04S 30/14* (2013.01)

(58) Field of Classification Search
  CPC . Y02T 90/169; Y02T 90/168; Y02T 10/6286; Y02T 10/7005; Y02T 10/7077; Y02B 70/3225; B60W 2710/244
  USPC ........................................................ 320/134
  See application file for complete search history.

(56) References Cited

U.S. PATENT DOCUMENTS

| | | | |
|---|---|---|---|
| 8,600,593 B2 * | 12/2013 | Ohno | H01M 10/44 701/22 |
| 2011/0049978 A1 * | 3/2011 | Sasaki | H01F 38/14 307/9.1 |

\* cited by examiner

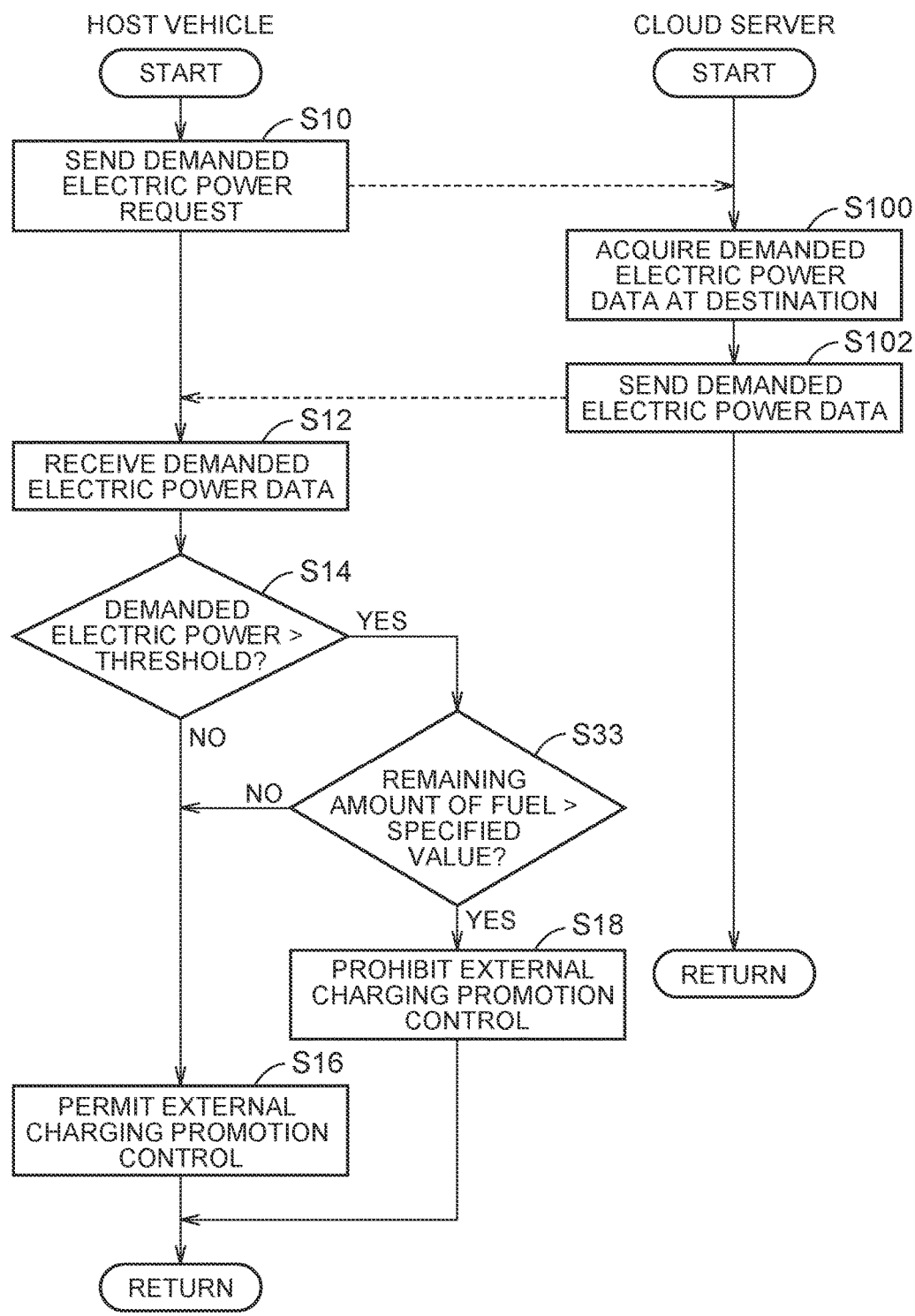

ELECTRICALLY-DRIVEN VEHICLE AND CONTROL METHOD FOR ELECTRICALLY-DRIVEN VEHICLE

INCORPORATION BY REFERENCE

The disclosure of Japanese Patent Application No. 2016-250854 filed on Dec. 26, 2016 including the specification, drawings and abstract is incorporated herein by reference in its entirety.

BACKGROUND

1. Technical Field

The present disclosure relates to an electrically-driven vehicle configured to be communicable with an external server and a control method for an electrically-driven vehicle and, in particular, to control for promoting external charging of an electric power storage device mounted on the electrically-driven vehicle.

2. Description of Related Art

In Japanese Patent Application Publication No. 2008-100646 (JP 2008-100646 A), a hybrid vehicle is disclosed. The hybrid vehicle is configured to be able to perform external charging in which an in-vehicle electric power storage device is charged by using electric power supplied from a power feeding device on the outside of the vehicle. This hybrid vehicle is configured to execute control for urging a user to perform the external charging of the electric power storage device at a set destination (hereinafter also referred to as "external charging promotion control" or simply referred to as "charging promotion control") when the vehicle arrives at the destination.

SUMMARY

In the hybrid vehicle disclosed in JP 2008-100646 A, when the vehicle arrives at the destination, the charging promotion control is executed with no consideration of whether electricity supply-demand balance at the destination is tight. Accordingly, in the case where the user performs the external charging in accordance with the charging promotion control in a situation where the electricity supply-demand balance at the destination is tight, the already-tight electricity supply-demand balance is further tightened.

The present disclosure provides an electrically-driven vehicle and a control method for an electrically-driven vehicle that suppress tight electricity supply-demand balance from being further tightened by charging promotion control in a situation where the electricity supply-demand balance is tight.

A first aspect of the present disclosure provides an electrically-driven vehicle that is configured to be connected to a power feeding device on the outside of the vehicle. The electrically-driven vehicle includes a rotary electric machine, an electric power storage device, a communication device, and an electronic control unit. The electric power storage device is configured to store electric power that is used to drive the rotary electric machine. The communication device is configured to communicate with a server on the outside of the vehicle. The electronic control unit is configured to control external charging in which the electric power storage device is charged by using the electric power that is supplied from the power feeding device. The electronic control unit is configured to acquire information from the server, the information indicating a degree of tightness in electricity supply-demand balance at a destination of the electrically-driven vehicle. The electronic control unit is configured to prohibit execution of charging promotion control for urging a user to perform the external charging at the destination when the acquired information indicates that the degree of the tightness is higher than a reference level.

In the electrically-driven vehicle with the above configuration, the information indicative of the degree of the tightness in the electricity supply-demand balance at the destination is acquired from the server on the outside of the vehicle. In this way, the degree of the tightness in the electricity supply-demand balance at the destination can be acknowledged in the electrically-driven vehicle. Then, in the case where the acquired degree of the tightness is higher than the reference level, the execution of the charging promotion control is prohibited. Thus, in a situation where the electricity supply-demand balance is tight, the user is suppressed from performing the external charging in accordance with the charging promotion control. As a result, in the situation where the electricity supply-demand balance is tight, the already-tight electricity supply-demand balance can be suppressed from being further tightened by the charging promotion control.

The electrically-driven vehicle may be a hybrid vehicle that travels by using power of at least one of the rotary electric machine and an engine. The electronic control unit may be configured to change the reference level by using at least one of a degree of degradation of fuel for the engine, moisture content of a lubricant in the engine, and a remaining amount of the fuel for the engine.

Thus, in the hybrid vehicle with the above configuration, in accordance with at least one of the degree of the degradation of the fuel, the moisture content of the lubricant, and the remaining amount of the fuel for the engine, the prohibition of the charging promotion control can be facilitated, or the charging promotion control can be less likely to be prohibited.

For example, in the case where the degree of the degradation of the fuel for the engine is high, the reference level is lowered to facilitate the prohibition of the charging promotion control. In this way, travel using the engine can be promoted. As a result, consumption of the fuel for the engine is facilitated, and thus the further degradation of the fuel is suppressed. On the other hand, in the case where the degree of the degradation of the fuel for the engine is low, necessity of promptly consuming the fuel (necessity of actuating the engine) is low. Thus, the charging promotion control can be less likely to be prohibited by increasing the reference level.

In addition, for example, in the case where the moisture content of the lubricant in the engine is high, the reference level is lowered to facilitate the prohibition of the charging promotion control and the engine is facilitated to start. As a result, the moisture content of the lubricant is more likely to be decreased by exhaust heat of the engine. On the other hand, in the case where the moisture content of the lubricant in the engine is low, necessity of promptly decreasing the moisture content of the lubricant (the necessity of actuating the engine) is low. Thus, the charging promotion control can be less likely to be prohibited by increasing the reference level.

Furthermore, for example, in the case where the remaining amount of the fuel for the engine is large, it is assumed that urgency of the external charging is low. Thus, the reference level is lowered to facilitate the prohibition of the charging promotion control. In this way, the already-tight electricity supply-demand balance can easily be suppressed from being further tightened. On the other hand, in the case where the remaining amount of the fuel for the engine is small, it is assumed that the urgency of the external charging is high. Thus, the charging promotion control can be less likely to be prohibited by increasing the reference level.

The electrically-driven vehicle may be a hybrid vehicle that travels by using power of at least one of the rotary electric machine and an engine. The electronic control unit may be configured to prohibit the execution of the charging promotion control when the acquired degree of the tightness is higher than the reference level and the degree of the degradation of the fuel for the engine is higher than a specified value.

In the hybrid vehicle with the above configuration, in the cases where the electricity supply-demand balance is tight and the degree of the degradation of the fuel for the engine is higher than the specified value, the execution of the charging promotion control is prohibited. In this way, while the already-tight electricity supply-demand balance is suppressed from being further tightened, the consumption of the fuel for the engine is facilitated, and thus the further degradation of the fuel can easily be suppressed.

The electrically-driven vehicle may be a hybrid vehicle that travels by using power of at least one of the rotary electric machine and an engine. The electronic control unit may be configured to prohibit the execution of the charging promotion control when the acquired degree of the tightness is higher than the reference level and the moisture content of the lubricant in the engine is higher than a specified value.

In the hybrid vehicle with the above configuration, in the cases where the electricity supply-demand balance is tight and the moisture content of the lubricant in the engine is higher than the specified value, the execution of the charging promotion control is prohibited. In this way, while the already-tight electricity supply-demand balance is suppressed from being further tightened, the engine is facilitated to start, and thus a decrease in the moisture content of the lubricant can be facilitated.

The electrically-driven vehicle may be a hybrid vehicle that travels by using power of at least one of the rotary electric machine and an engine. The electronic control unit may be configured to prohibit the execution of the charging promotion control when the acquired degree of the tightness is higher than the reference level and the remaining amount of the fuel for the engine is larger than a specified value.

In the hybrid vehicle with the above configuration, the execution of the charging promotion control can be prohibited in a situation where the electricity supply-demand balance is tight, the remaining amount of the fuel is large, and the urgency of the external charging is low.

A second aspect of the present disclosure provides a control method for an electrically-driven vehicle that is configured to be connected to a power feeding device on the outside of the vehicle. The vehicle includes a rotary electric machine, an electric power storage device, a communication device, and an electronic control unit. The electric power storage device is configured to store electric power that is used to drive the rotary electric machine. The communication device is configured to communicate with a server on the outside of the vehicle. The control method includes: controlling, by the electronic control unit, external charging in which the electric power storage device is charged by using the electric power that is supplied from the power feeding device; acquiring, by the electronic control unit, information from the server, the information indicating a degree of tightness of electricity supply-demand balance at a destination of the electrically-driven vehicle; and prohibiting, by the electronic control unit, execution of charging promotion control for urging a user to perform the external charging at the destination when the acquired information indicates that the degree of the tightness is higher than a reference level, the charging promotion control.

According to the above configuration, similar effects to those of the above-described electrically-driven vehicle can be obtained.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 8 is a flowchart of one example of a processing procedure by a control unit according to a fifth embodiment.

DETAILED DESCRIPTION OF EMBODIMENTS

Figure 1:
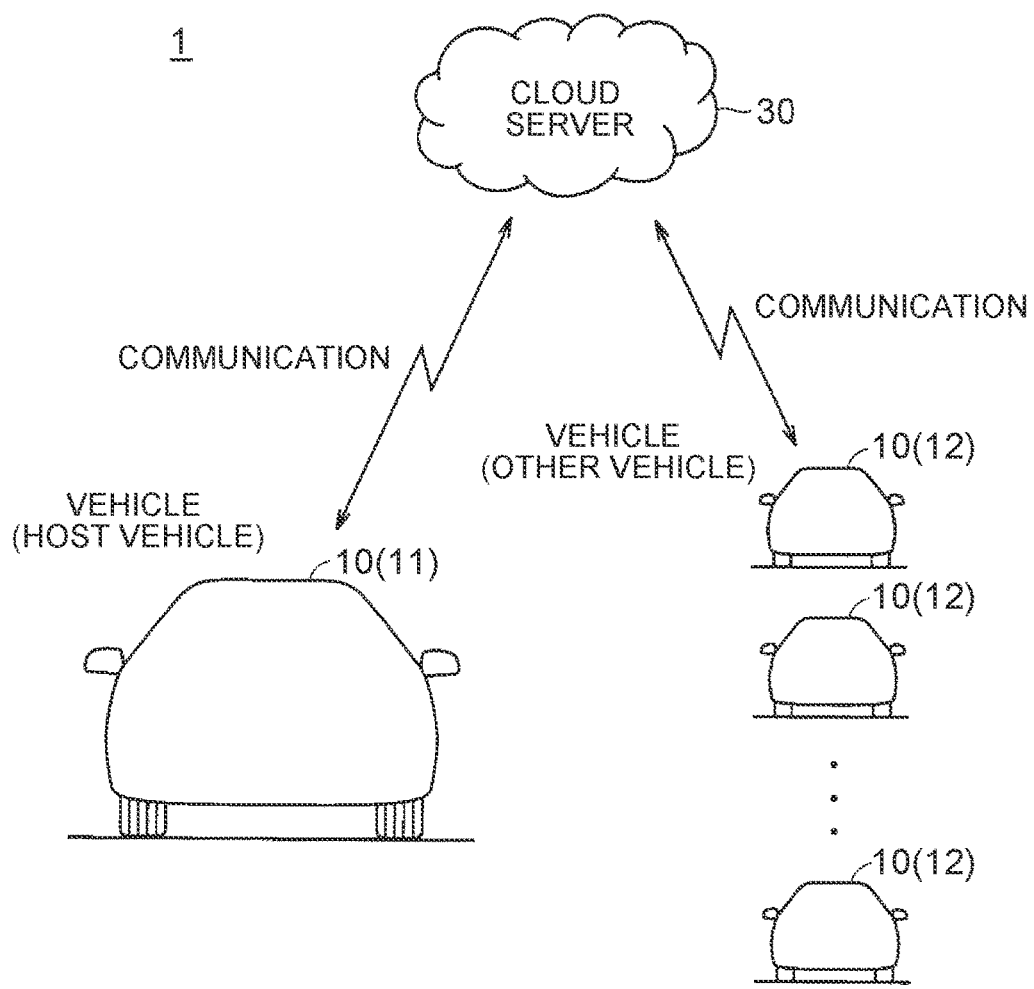
FIG. 1 is a schematic view that shows one example of an overall configuration of a vehicle control system.

A detailed description will hereinafter be made on embodiments of the present disclosure with reference to the drawings. Note that the same or corresponding portions in the drawings are denoted by the same reference numerals and signs and the description thereon will not be repeated.

First Embodiment

FIG. 1 is a schematic view that shows one example of an overall configuration of a vehicle control system 1 according to this first embodiment. The vehicle control system 1 includes plural vehicles 10 and a cloud server 30.

Each of the vehicles 10 is a so-called connected vehicle that is configured to be wirelessly communicable with the cloud server 30. Each of the vehicles 10 sends plural types of information that are related to vehicle travel such as a current position and a travel load (travel power) (hereinafter also simply referred to as "vehicle travel information") to the cloud server 30 in specified cycles (for example, every few seconds).

The cloud server 30 stratifies and accumulates the information (the above-described vehicle travel information and the like), which is received from each of the vehicles 10, for each of the vehicles 10. In response to a request from each of the vehicles 10, the cloud server 30 is configured to be able to send data that is requested by the vehicle 10 to the vehicle 10.

Furthermore, the cloud server 30 communicates with an electric power company, which is not shown and maintains and manages system power supplies, and the like so as to manage electricity supply-demand balance (demanded electric power, supplied electric power, and a balance therebetween) in each part of a controlled area by the electric power company. In response to a request from each of the vehicles 10, the cloud server 30 is configured to be able to send information that indicates a degree of tightness in the electricity supply-demand balance at a destination of the vehicle 10 to the vehicle 10.

Hereinafter, of the vehicles 10, the vehicle that executes control according to the present disclosure will also be described as a "host vehicle 11", and the vehicles 10 other than the host vehicle 11 will also be described as "other vehicles 12". In this embodiment, the host vehicle 11 is a hybrid vehicle that includes a motor generator and an engine as driving force sources. A vehicle type of the other vehicle 12 is not particularly limited as long as the other vehicle 12 is a vehicle that can send the above vehicle travel information to the cloud server 30. For example, the other vehicle 12 may be the hybrid vehicle, an electric vehicle or a fuel cell vehicle that includes a motor as the driving force source, or a conventional vehicle (an engine vehicle) that includes the engine as the driving force source.

Figure 2:
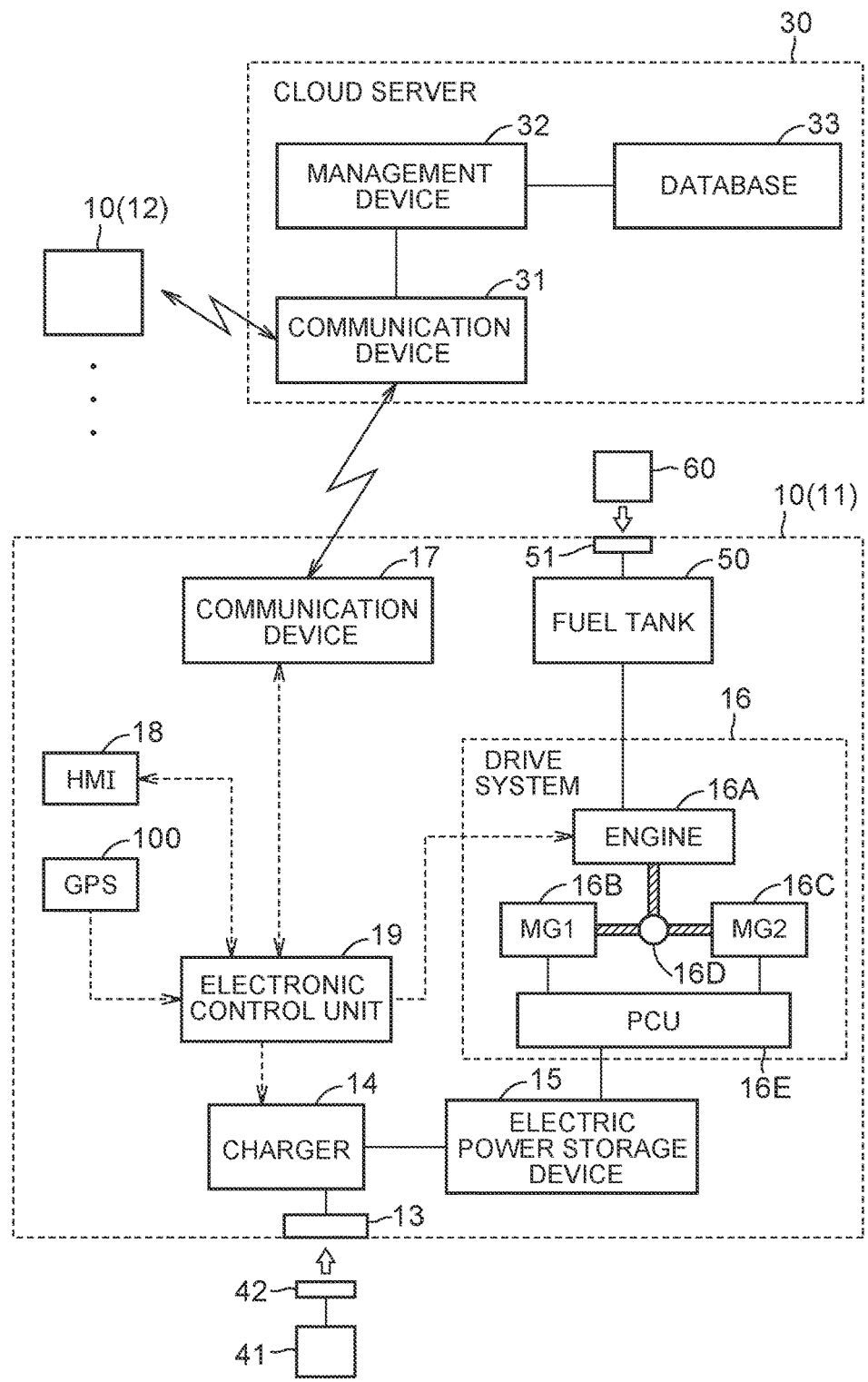
FIG. 2 is a detailed view of one example of configurations of a host vehicle and a cloud server.

FIG. 2 is a detailed view of one example of configurations of the host vehicle 11 and the cloud server 30. In the example shown in FIG. 2, the host vehicle 11 is a so-called plug-in hybrid vehicle. More specifically, the host vehicle 11 includes an inlet 13, a charger 14, an electric power storage device 15, a drive system 16, a communication device 17, a human machine interface (HMI) device 18, an electronic control unit 19, and a global positioning system (GPS) module 100. The cloud server 30 includes a communication device 31, a management device 32, and a database (a storage device) 33.

The inlet 13 is configured to be connectable with a connector 42 of a power feeding facility 41 on the outside of the vehicle. The power feeding facility 41 is connected to a system power supply, which is not shown, and is configured to be able to supply electric power from the system power supply to the host vehicle 11 that is connected to the connector 42.

The charger 14 is provided between the inlet 13 and the electric power storage device 15, converts external electric power received from the power feeding facility 41 to electric power storable in the electric power storage device 15, and outputs the converted electric power to the electric power storage device 15. Hereinafter, charging of the electric power storage device 15 using the external electric power will also be referred to as "external charging".

The electric power storage device 15 is configured to be rechargeable. The electric power storage device 15 is a secondary battery such as a nickel-metal hydride battery or a lithium-ion battery. Note that the electric power storage device 15 may be a capacitor of large capacitance.

The drive system 16 generates drive power of the host vehicle 11. The drive system 16 includes an engine 16A, a first motor generator (MG) 16B, a second motor generator (MG) 16C, a power split device 16D, and a power control unit (PCU) 16E.

The engine 16A is an internal combustion engine such as a gasoline engine or a diesel engine. The engine 16A is controlled by a control signal from the electronic control unit 19. Note that, output of the engine 16A is used for both of power generation and driving in this embodiment; however, application of the engine is not limited to both of the power generation and driving but may only be the power generation or may only be driving.

The host vehicle 11 further includes a fuel tank 50 and a fuel filler opening 51. The fuel filler opening 51 is configured to be connectable with a fuel filling facility 60 of a fuel filling station. The fuel tank 50 stores fuel (gasoline, diesel oil, or the like) that is supplied through the fuel filler opening 51. The engine 16A generates power by using the fuel that is supplied from the fuel tank 50.

The power generated by the engine 16A is split into power transmitted to drive wheels via a path and power transmitted to the first MG 16B via a path by the power split device 16D.

Each of the first MG 16B and the second MG 16C is a three-phase AC rotary electric machine that is driven by the PCU 16E. The first MG 16B generates the electric power by using the power of the engine 16A, which is split by the power split device 16D. The second MG 16C generates the drive power of the host vehicle 11 by using at least one of the electric power stored in the electric power storage device 15 and the electric power generated by the first MG 16B. In addition, the second MG 16C generates regenerative electric power by using kinetic energy of the host vehicle 11, which is transmitted from the drive wheels, during inertia travel in an accelerator-off state (a state where a user does not depress an accelerator pedal). The regenerative electric power that is generated by the second MG 16C is collected in the electric power storage device 15.

The power split device 16D includes a planetary gear mechanism that mechanically couples the engine 16A, the first MG 16B, and the second MG 16C.

The PCU 16E converts DC power stored in the electric power storage device 15 to AC power with which the first MG 16B and the second MG 16C can be driven. In addition, the PCU 16E converts the AC power generated by the first MG 16B and the second MG 16C to the DC power that can be stored in the electric power storage device 15.

The communication device 17 is configured to be wirelessly communicable with the communication device 31 of the cloud server 30. The communication device 17 is connected to the electronic control unit 19 by a communication line, sends information transmitted from the electronic control unit 19 to the cloud server 30, and transmits information received from the cloud server 30 to the electronic control unit 19.

The HMI device 18 is a device that provides the user with various types of information and that receives a user's operation. The HMI device 18 includes a display, a speaker, and the like provided in a cabin.

The GPS module 100 is a receiver that is used in a satellite positioning system. The GPS module 100 computes the current position of the host vehicle 11 on the basis of a received signal and outputs a computation result to the electronic control unit 19. Note that the GPS module 100 may be incorporated in a navigation system that includes a map database.

Furthermore, although not shown, the host vehicle 11 includes plural sensors that detect various physical quantities required for control of the host vehicle 11, and the plural sensors include: a vehicle speed sensor that detects a vehicle speed; a monitoring sensor that detects states (a voltage, a current, a temperature, and the like) of the electric power storage device 15; an acceleration sensor that detects acceleration of the host vehicle 11; and the like. Each of these sensors outputs a detection result to the electronic control unit 19.

The electronic control unit 19 includes a CPU and memory, which are not shown, therein and controls various types of equipment of the host vehicle 11 (the charger 14, the drive system 16, the communication device 17, the HMI device 18, and the like) on the basis of information stored in the memory and information from each of the sensors.

As described above, the cloud server 30 includes the communication device 31, the management device 32, and the database 33.

The communication device 31 is configured to be wirelessly communicable with the communication device 17 of the vehicle 10. The communication device 31 is connected to the management device 32 by a communication line, sends information transmitted from the management device 32 to the vehicle 10, and transmits the information received from the vehicle 10 to the management device 32.

The management device 32 includes a CPU, which is not shown, therein and stores the information received from each of the vehicles 10 such as the vehicle travel information in the database 33. The management device 32 also performs various calculations by using the information on the vehicle 10 that is stored in the database 33.

The communication device 31 communicates with the electric power company, which is not shown and maintains and manages the system power supplies, and the like, and is configured to be able to acquire electricity supply-demand balance information (information indicating the demanded electric power and the supplied electric power) in each part of the controlled area by the electric power company. In response to the request from each of the vehicles 10, the management device 32 is configured to be able to send the degree of the tightness in the electricity supply-demand balance at the destination of the vehicle 10 to the vehicle 10.

Vehicle Control Modes

The electronic control unit 19 of the vehicle 10 selects either a Charge Depleting (CD) mode or a Charge Sustaining (CS) mode, and controls the drive system 16 (the engine 16A, the PCU 16E, and the like) in accordance with the selected mode. The CD mode is a control mode in which a State Of Charge (SOC) of the electric power storage device 15 is depleted. The CS mode is a control mode in which the SOC is maintained within a specified range.

The electronic control unit 19 selects the CD mode until the SOC of the electric power storage device 15 is decreased to a specified value Stg. Then, after the SOC is decreased to the specified value Stg, the electronic control unit 19 selects the CS mode.

Figure 3:
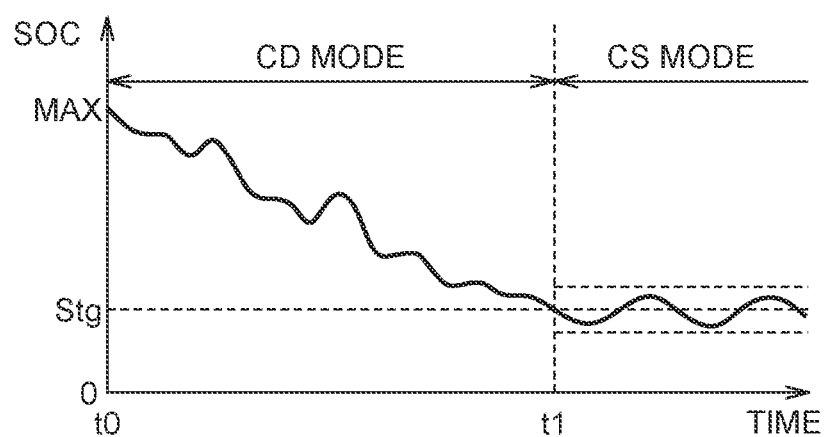
FIG. 3 is a chart that illustrates a CD mode and a CS mode.

FIG. 3 is a chart that illustrates the CD mode and the CS mode. In FIG. 3, a horizontal axis represents time, and a vertical axis represents the SOC. In the example shown in FIG. 3, a case where the travel is started at time t0 after the electric power storage device 15 becomes a full-charged state (SOC=MAX) by the external charging is shown.

In the CD mode, the electric power that is stored in the electric power storage device 15 (mainly the electric power stored therein by the external charging) is basically consumed. During the travel in the CD mode, the engine 16A is not actuated for a purpose of maintaining the SOC. Accordingly, although there is a case where the SOC is temporarily increased due to the regenerative electric power generated by the second MG 16C during deceleration and the like, an amount of the discharged electric power becomes larger than an amount of the stored electric power as a result, and the SOC as a whole is gradually decreased.

On the other hand, in the CS mode, SOC is maintained within the specified range. As one example, when the SOC is decreased to the specified value Stg at time t1, the electronic control unit 19 starts the engine 16A and shifts the control mode from the CD mode to the CS mode. Thereafter, the electronic control unit 19 actuates the engine 16A intermittently so as to maintain the SOC within the specified range. More specifically, when the SOC is decreased to a lower limit value of the specified range, the electronic control unit 19 actuates the engine 16A. Then, when the SOC is increased to an upper limit value of the specified range, the electronic control unit 19 stops the engine 16A. In this way, the SOC is maintained within the specified range. That is, in the CS mode, the engine 16A is actuated to maintain the SOC within the specified range.

In either one of the CD mode and the CS mode, requested travel power is computed from an accelerator pedal operation amount by the user and a vehicle speed. Then, in the case where the requested travel power is lower than a specified engine start threshold, the engine 16A is stopped, and EV travel in which the travel power is generated solely by the second MG 16C or by both of the first MG 16B and the second MG 16C is made. On the other hand, in the case where the requested travel power is higher than the engine start threshold, HV travel in which the travel power is generated by the second MG 16C and the engine 16A is made.

The electric power that is generated by the first MG 16B in conjunction with the actuation of the engine 16A is directly supplied to the second MG 16C and/or is stored in the electric power storage device 15. Note that the engine start threshold in the CD mode is set to a larger value than the engine start threshold in the CS mode.

As described above, also in the CD mode, the engine 16A is actuated in the case where the requested travel power is higher than the engine start threshold. Meanwhile, also in the CS mode, the engine 16A is stopped when the SOC is increased. In other words, the CD mode is not limited to the EV travel in which the travel is made with the engine 16A being constantly stopped, and the CS mode is not limited to the HV travel in which the travel is made with the engine 16A being constantly actuated. In both of the CD mode and the CS mode, the EV travel and the HV travel can be made.

Execution and Prohibition of External Charging Promotion Control

The electronic control unit 19 of the host vehicle 11 according to this embodiment is configured to execute external charging promotion control. The external charging promotion control is processing to urge the user to perform the external charging at a destination where the power feeding facility 41 is provided when the host vehicle 11 arrives at the destination. More specifically, when the host vehicle 11 arrives at the destination, the electronic control unit 19 causes the HMI device 18 to output a message image or an audio guide that urges the user to perform the external charging at the destination.

However, in the case where the external charging promotion control is uniformly executed with no consideration of a situation of the electricity supply-demand balance at the destination when the host vehicle 11 arrives at the destination, the user performs the external charging in accordance with the external charging promotion control regardless of a possibility that the electricity supply-demand balance at the destination is tight. As a result, the already-tight electricity supply-demand balance is possibly tightened.

To handle the above problem, the electronic control unit 19 of the host vehicle 11 according to this embodiment acquires information that indicates the degree of the tightness in the electricity supply-demand balance (hereinafter also referred to as "electricity supply-demand balance tightness information") at the destination of the host vehicle 11 from the cloud server 30. Then, in the case where the acquired electricity supply-demand balance tightness information indicates that the degree of the tightness is higher than a reference level, the electronic control unit 19 prohibits the execution of the external charging promotion control. In this way, in a situation where the electricity supply-demand balance at the destination is tight, the user is suppressed from performing the external charging at the destination in accordance with the external charging promotion control. As a result, the already-tight electricity supply-demand balance can be suppressed from being further tightened by the external charging promotion control.

Various types of information can be used as the "electricity supply-demand balance tightness information" that the host vehicle 11 acquires from the cloud server 30.

For example, the "demanded electric power" can be used as the electricity supply-demand balance tightness information. In this case, in the case where the "demanded electric power" that is received from the cloud server 30 is higher than a threshold, the electronic control unit 19 can determine that the degree of the tightness in the electricity supply-demand balance at the destination is higher than the reference level.

In addition, the "supplied electric power" can be used as the electricity supply-demand balance tightness information. In this case, in the case where the "supplied electric power" that is received from the cloud server 30 is lower than the threshold, the electronic control unit 19 can determine that the degree of the tightness in the electricity supply-demand balance at the destination is higher than the reference level.

Furthermore, a "value acquired by subtracting the demanded electric power from the supplied electric power" can be used as the electricity supply-demand balance tightness information. In this case, in the case where the "value acquired by subtracting the demanded electric power from the supplied electric power" that is received from the cloud server 30 is smaller than a threshold, the electronic control unit 19 can determine that the degree of the tightness in the electricity supply-demand balance at the destination is higher than the reference level.

Moreover, the cloud server 30 can determine whether the degree of the tightness in the electricity supply-demand balance at the destination of the host vehicle 11 is higher than the reference level, and the host vehicle 11 can receive a determination result as the electricity supply-demand balance tightness information. In this case, the electronic control unit 19 can comprehend whether the degree of the tightness in the electricity supply-demand balance at the destination is higher than the reference level directly from the electricity supply-demand balance tightness information.

A description will hereinafter be made on a control example in which the "demanded electric power" is primarily used as the electricity supply-demand balance tightness information. Note that the "destination" described below means a point at which the power feeding facility 41 is provided and the external charging can be performed.

Figure 4:
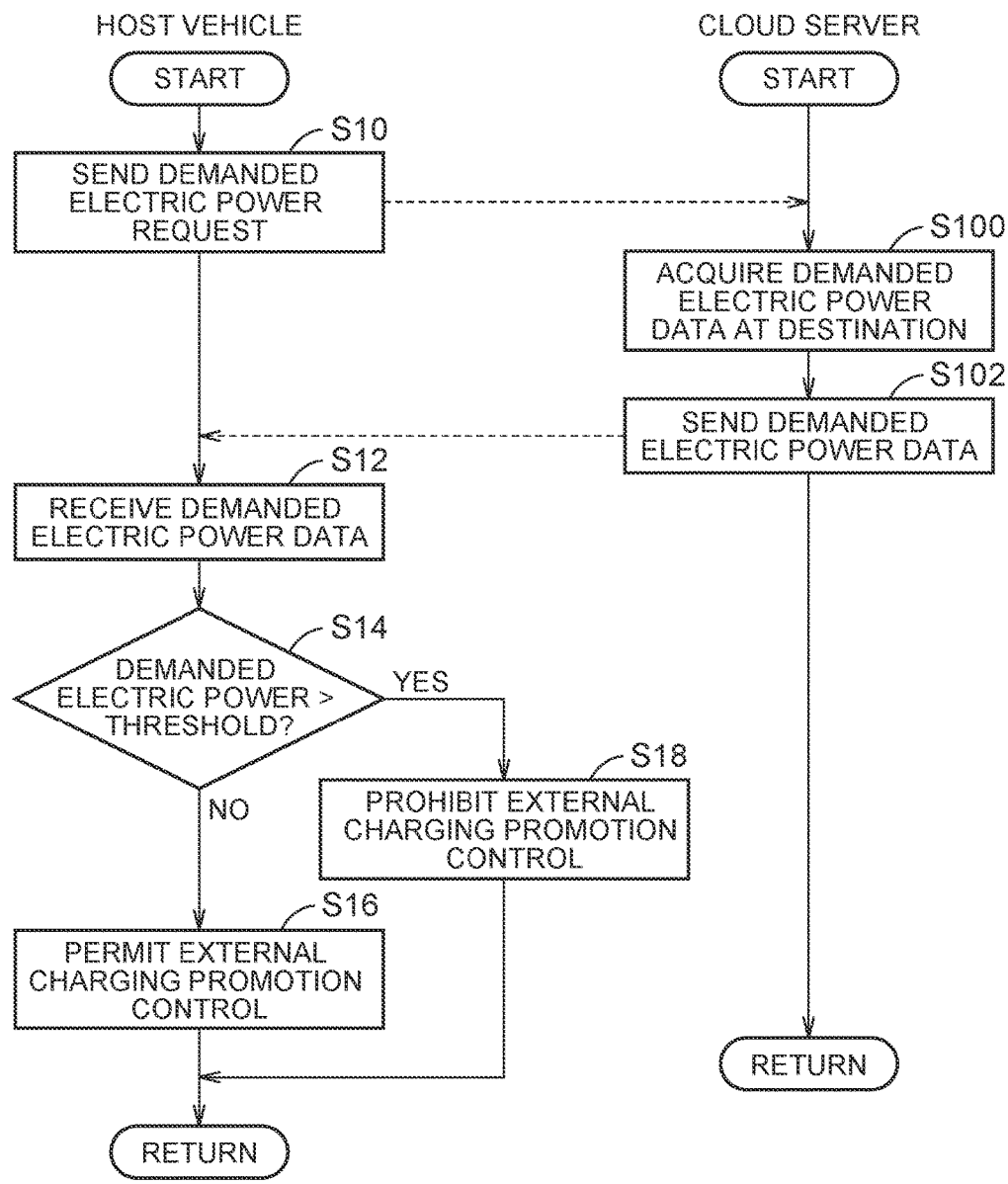
FIG. 4 is a flowchart of one example of a processing procedure by a control unit according to a first embodiment.

FIG. 4 is a flowchart of one example of a processing procedure at a time when the electronic control unit 19 of the host vehicle 11 decides whether to permit the external charging promotion control. This flowchart is repeatedly executed in specified cycles. Note that, in addition to processing by the electronic control unit 19 of the host vehicle 11, FIG. 4 shows processing executed by the cloud server 30 (the management device 32).

The electronic control unit 19 of the host vehicle 11 sends a demanded electric power request to the cloud server 30 (step S10). The demanded electric power request is a signal that requests the cloud server 30 to send demanded electric power data (the electricity supply-demand balance tightness information) at the destination of the host vehicle 11 to the host vehicle 11. The demanded electric power request includes vehicle identification information that is used to identify the host vehicle 11, information on the destination of the host vehicle 11, and the like.

When receiving the demanded electric power request from the host vehicle 11, the cloud server 30 communicates with the electric power company and the like to acquire the demanded electric power data (the electricity supply-demand balance tightness information) at the destination of the host vehicle 11 (step S100). Then, the cloud server 30 sends the acquired demanded electric power data (the electricity supply-demand balance tightness information) to the host vehicle 11 (step S102).

The electronic control unit 19 of the host vehicle 11 receives the demanded electric power data (the electricity supply-demand balance tightness information) from the cloud server 30 (step S12).

Next, the electronic control unit 19 determines whether the received demanded electric power is higher than the threshold (step S14). This determination is processing to determine whether the degree of the tightness in the electricity supply-demand balance at the destination is the higher degree of the tightness than the reference level.

If it is not determined that the received demanded electric power is higher than the threshold (NO in step S14), that is, if the electricity supply-demand balance tightness information indicates that the degree of the tightness is lower than the reference level, the electronic control unit 19 of the host vehicle 11 permits the execution of the external charging promotion control (step S16). In this way, when the host vehicle 11 arrives at the destination, the message image or the audio guide that urges the user to perform the external charging is output from the HMI device 18.

On the other hand, if it is determined that the received demanded electric power is higher than the threshold (YES in step S14), that is, if the electricity supply-demand balance tightness information indicates that the degree of the tightness is higher than the reference level, the electronic control unit 19 of the host vehicle 11 prohibits the execution of the external charging promotion control (step S18).

As it has been described so far, the electronic control unit 19 of the host vehicle 11 according to this embodiment acquires the demanded electric power at the destination of the host vehicle 11 as the "electricity supply-demand balance tightness information" from the cloud server 30. Then, in the case where the acquired demanded electric power is higher than the threshold, the electronic control unit 19 of the host vehicle 11 determines that the degree of the tightness in the electricity supply-demand balance at the destination is higher than the reference level, and thereby prohibits the execution of the external charging promotion control. In this way, in the situation where the electricity supply-demand balance at the destination is tight, the user is suppressed from performing the external charging at the destination in accordance with the external charging promotion control. As a result, the already-tight electricity supply-demand balance can be suppressed from being further tightened by the external charging promotion control.

Modified Example

In the above-described first embodiment, the description has been made on the case where the host vehicle 11 is the plug-in hybrid vehicle that includes the engine 16A. However, in the above-described first embodiment, the host vehicle 11 is not necessarily limited to the plug-in hybrid vehicle and may be an electric vehicle that does not include an engine.

Second Embodiment

In the above-described first embodiment, the "threshold" (the reference level of the degree of the tightness in the electricity supply-demand balance) that is compared with the demanded electric power in step S14 of FIG. 4 is a fixed value.

Meanwhile, in this second embodiment, the above "threshold" is changed by using at least one of a degree of degradation of the fuel for the engine 16A, moisture content of oil (in a lubricant path), and a remaining amount of the fuel. Because the other configurations, functions, and processing are the same as those in the above-described first embodiment, the detailed description thereon will not be made herein.

Change of "Threshold" Using Degree of Degradation of Fuel for Engine 16A

As it has been described so far, the CD mode is selected in the host vehicle 11 until the SOC of the electric power storage device 15 falls below the specified value Stg (see FIG. 3). In the CD mode, the EV travel is basically made, and the HV travel is not made. Accordingly, in the case where the external charging is performed before the SOC of the electric power storage device 15 falls below the specified value Stg, the fuel for the engine 16A is hardly consumed. In the case where such a state continues for a specified period (for example, approximately one year) or longer, it is concerned that the degraded fuel due to aging remains in the fuel tank 50.

In view of this point, the electronic control unit 19 of the host vehicle 11 according to this second embodiment determines the degree of the degradation of the fuel on the basis of a period in which the fuel is not supplied, for example. Then, in the case where the degree of the degradation of the fuel is higher than a specified value, the electronic control unit 19 of the host vehicle 11 changes the "threshold" to a smaller value than an initial value. In this way, the prohibition of the external charging promotion control is facilitated, and the SOC of the electric power storage device 15 is more likely to fall below the specified value Stg. Thus, the travel using the engine 16A can be promoted. As a result, the consumption of the fuel for the engine 16A is facilitated, and thus the further degradation of the fuel is suppressed.

On the other hand, in the case where the degree of the degradation of the fuel is lower than the specified value, necessity of promptly consuming the fuel is low. Accordingly, the electronic control unit 19 sets the "threshold" to a larger value than the threshold of the case where the degree of the degradation of the fuel is high (for example, maintains the "threshold" to the initial value, or changes the "threshold" to a larger value than the initial value). In this way, the external charging promotion control can be less likely to be prohibited.

Change of "Threshold" Using Moisture Content of Oil in Engine 16A

As described above, the CD mode is selected in the host vehicle 11 until the SOC of the electric power storage device 15 falls below the specified value Stg. Accordingly, in the case where the external charging is performed before the SOC of the electric power storage device 15 falls below the specified value Stg, the engine 16A is possibly maintained in a stopped state for a long period. In the case where a stop period of the engine 16A is long, it is concerned that the moisture content of oil in the engine 16A is increased, which possibly degrades the oil and possibly disallows the engine 16A to exert full performance.

In view of this point, the electronic control unit 19 of the host vehicle 11 according to this second embodiment estimates the moisture content of the oil on the basis of speed history and oil temperature history of the engine 16A, for example. Then, in the case where the moisture content of the oil is higher than a specified value, the electronic control unit 19 of the host vehicle 11 changes the "threshold" to the smaller value than the initial value. In this way, the prohibition of the external charging promotion control is facilitated, and the SOC of the electric power storage device 15 is more likely to fall below the specified value Stg. Thus, the engine 16A can be more likely to be started. As a result, moisture in the oil is more likely to be evaporated by exhaust heat of the engine 16A, and thus a decrease in the moisture content of the oil can be facilitated.

On the other hand, in the case where the moisture content of the oil is lower than the specified value, necessity of promptly decreasing the moisture content of the oil is low. Accordingly, the electronic control unit 19 sets the "threshold" to the larger value than the threshold of the case where the moisture content is high (for example, maintains the "threshold" to the initial value, or changes the "threshold" to the larger value than the initial value). In this way, the external charging promotion control can be less likely to be prohibited.

Change of "Threshold" Using Remaining Amount of Fuel for Engine 16A

In the case where the remaining amount of the fuel for the engine 16A is large in the host vehicle 11, the host vehicle 11 is in a state where a travel distance thereof is sufficiently secured. Thus, it is assumed that urgency of the external charging is low.

In view of this point, the electronic control unit 19 of the host vehicle 11 according to this second embodiment uses a sensor, which is not shown, to detect the remaining amount of the fuel for the engine 16A, for example. Then, in the case where the detected remaining amount of the fuel is larger than a specified value, the electronic control unit 19 of the host vehicle 11 changes the "threshold" to the smaller value than the initial value. In this way, in a situation where the urgency of the external charging is low, the prohibition of the external charging promotion control is facilitated. As a result, the already-tight electricity supply-demand balance for the electric power can easily be suppressed from being further tightened by the external charging promotion control.

On the other hand, in the case where the remaining amount of the fuel is smaller than the specified value, the electronic control unit 19 of the host vehicle 11 sets the "threshold" to the larger value than the threshold of the case where the remaining amount of the fuel is large (for example, maintains the "threshold" to the initial value, or changes the "threshold" to the larger value than the initial value). In this way, the external charging promotion control can be less likely to be prohibited in a situation where the urgency of the external charging is high.

Figure 5:
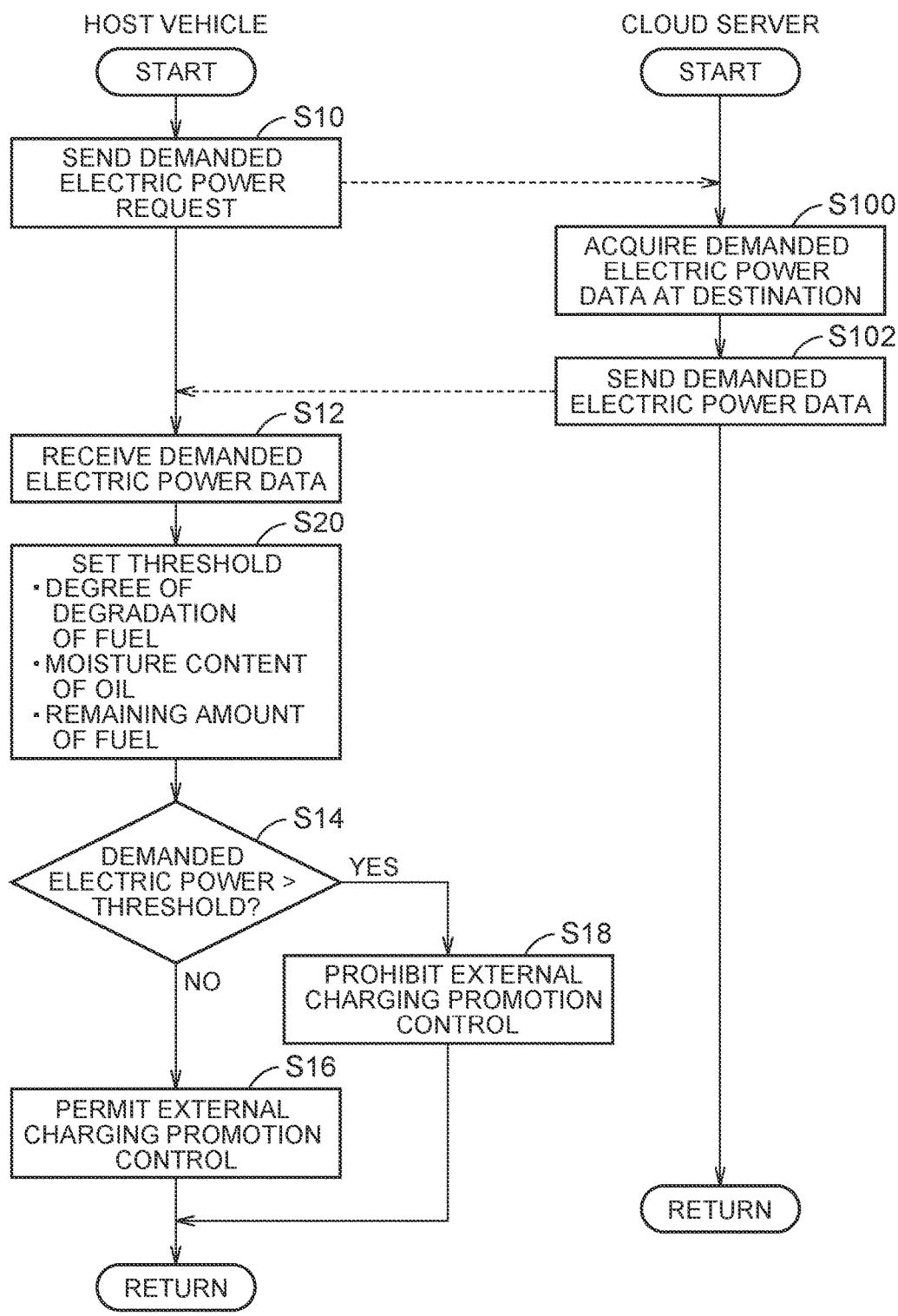
FIG. 5 is a flowchart of one example of a processing procedure by a control unit according to a second embodiment.

FIG. 5 is a flowchart of one example of a processing procedure at a time when the electronic control unit 19 of the host vehicle 11 according to this second embodiment decides whether to permit the external charging promotion control. Here, the description has already been made on steps that are shown in FIG. 5 and denoted by the same reference numbers as the above-described steps shown in FIG. 4. Thus, the detailed description thereon will not be made herein.

The electronic control unit 19 of the host vehicle 11 changes the "threshold" (the reference level of the degree of the tightness in the electricity supply-demand balance) that is compared with the demanded electric power in step S14 in accordance with at least one of the degree of the degradation of the fuel, the moisture content of the oil, and the remaining amount of the fuel for the engine 16A (step S20). Note that, because a changing method of the threshold has already been described, the detailed description thereon will not be made herein.

Then, the electronic control unit 19 of the host vehicle 11 determines whether the demanded electric power is higher than the "threshold" that is set in step S20 (step S14), and, in accordance with the determination result, decides whether to prohibit the external charging promotion control.

As it has been described so far, the electronic control unit 19 of the host vehicle 11 according to this second embodiment uses at least one of the degree of the degradation of the fuel, the moisture content of the oil, and the remaining amount of the fuel for the engine 16A, so as to change the "threshold" (the reference level of the degree of the tightness in the electricity supply-demand balance) that is compared with the demanded electric power. Thus, in accordance with at least one of the degree of the degradation of the fuel, the moisture content of the oil, and the remaining amount of the fuel for the engine 16A, the prohibition of external charging promotion control can be facilitated, or the external charging promotion control can be less likely to be prohibited.

Third Embodiment

In the above-described first embodiment, in the case where the demanded electric power at the destination is higher than the threshold (the case where the degree of the tightness in the electricity supply-demand balance at the destination is higher than the reference level), the execution of the external charging promotion control is prohibited.

Meanwhile, in this third embodiment, in the cases where the demanded electric power at the destination is higher than the threshold and where the degree of the degradation of the fuel for the engine 16A is higher than the specified value, the execution of the external charging promotion control is prohibited. Because the other configurations, functions, and processing are the same as those in the above-described first embodiment, the detailed description thereon will not be made herein.

Figure 6:
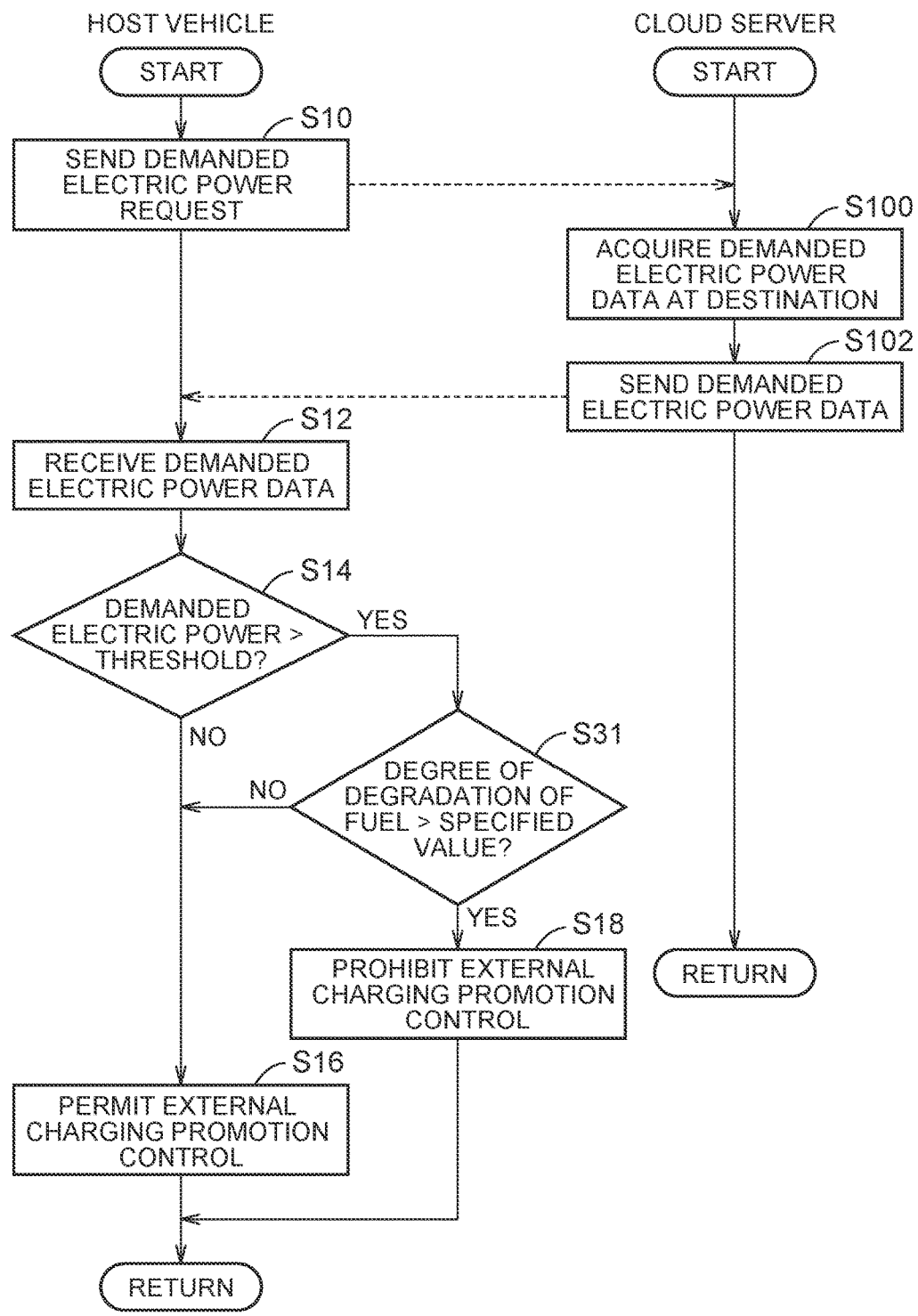
FIG. 6 is a flowchart of one example of a processing procedure by a control unit according to a third embodiment.

FIG. 6 is a flowchart of one example of a processing procedure at a time when the electronic control unit 19 of the host vehicle 11 according to this third embodiment decides whether to permit the external charging promotion control. Here, the description has already been made on steps that are shown in FIG. 6 and denoted by the same reference numbers as the above-described steps shown in FIG. 4. Thus, the detailed description thereon will not be made herein.

If it is determined that the demanded electric power, which is received from the cloud server 30, is higher than the threshold (YES in step S14), the electronic control unit 19 of the host vehicle 11 determines whether the degree of the degradation of the fuel for the engine 16A is higher than the specified value (step S31). This determination can be made on the basis of the period in which the fuel is not supplied to the host vehicle 11, for example.

Then, if it is determined that the degree of the degradation of the fuel is higher than the specified value (YES in step S31), the electronic control unit 19 prohibits the execution of the external charging promotion control (step S18). On the other hand, if it is not determined that the degree of the degradation of the fuel is higher than the specified value (NO in step S31), the electronic control unit 19 permits the execution of the external charging promotion control (step S16).

As it has been described so far, in this third embodiment, in the cases where the demanded electric power at the destination is higher than the threshold (the case where the degree of the tightness in the electricity supply-demand balance at the destination is higher than the reference level) and where the degree of the degradation of the fuel for the engine 16A is higher than the specified value, the execution of the external charging promotion control is prohibited. In this way, while the already-tight electricity supply-demand balance is suppressed from being further tightened, the consumption of the fuel for the engine 16A is facilitated, and thus the further degradation of the fuel can easily be suppressed.

Meanwhile, even in the case where the demanded electric power at the destination is higher than the threshold, the execution of the external charging promotion control is permitted when the degree of the degradation of the fuel for the engine 16A is lower than the specified value. In this way, in the case where the necessity of promptly consuming the fuel is low, the prohibition of the execution of the external charging promotion control can be suppressed.

Fourth Embodiment

In the above-described first embodiment, in the case where the demanded electric power at the destination is higher than the threshold (the case where the degree of the tightness in the electricity supply-demand balance at the destination is higher than the reference level), the execution of the external charging promotion control is prohibited.

Meanwhile, in this fourth embodiment, in the cases where the demanded electric power at the destination is higher than the threshold and where the moisture content of the oil in the engine 16A is higher than the specified value, the execution of the external charging promotion control is prohibited. Because the other configurations, functions, and processing are the same as those in the above-described first embodiment, the detailed description thereon will not be made herein.

Figure 7:
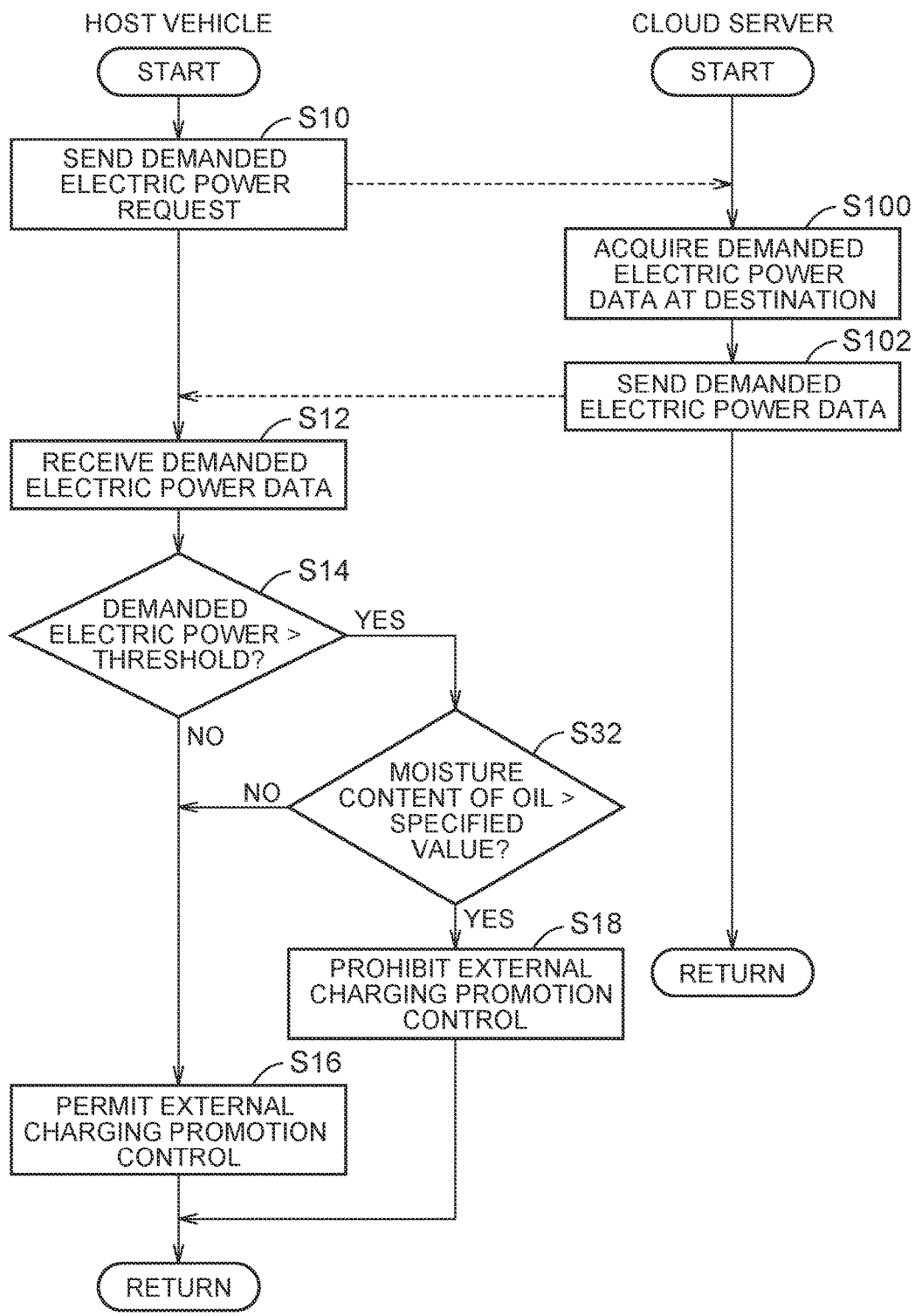
FIG. 7 is a flowchart of one example of a processing procedure by a control unit according to a fourth embodiment.

FIG. 7 is a flowchart of one example of a processing procedure at a time when the electronic control unit 19 of the host vehicle 11 according to this fourth embodiment decides whether to permit the external charging promotion control. Here, the description has already been made on steps that are shown in FIG. 7 and denoted by the same reference numbers as the above-described steps shown in FIG. 4. Thus, the detailed description thereon will not be made herein.

If it is determined that the demanded electric power, which is received from the cloud server 30, is higher than the threshold (YES in step S14), the electronic control unit 19 of the host vehicle 11 determines whether the moisture content of the oil in the engine 16A is higher than the specified value (step S32). The moisture content of the oil is estimated on the basis of the speed history and the oil temperature history of the engine 16A, for example.

Then, if it is determined that the moisture content of the oil is higher than the specified value (YES in step S32), the electronic control unit 19 of the host vehicle 11 prohibits the execution of the external charging promotion control (step S18). On the other hand, if it is not determined that the moisture content of the oil is higher than the specified value (NO in step S32), the electronic control unit 19 permits the execution of the external charging promotion control (step S16).

As it has been described so far, in this fourth embodiment, in the cases where the demanded electric power at the destination is higher than the threshold (the case where the degree of the tightness in the electricity supply-demand balance at the destination is higher than the reference level) and where the moisture content of the oil in the engine 16A is higher than the specified value, the execution of the external charging promotion control is prohibited. In this way, while the already-tight electricity supply-demand balance is suppressed from being further tightened, the engine 16A is more likely to be started, and thus the decrease in the moisture content of the oil can be facilitated.

Meanwhile, even in the case where the demanded electric power at the destination is higher than the threshold, the execution of the external charging promotion control is permitted when the moisture content of the oil in the engine 16A is lower than the specified value. In this way, in the case where the necessity of promptly decreasing the moisture content of the oil is low, the prohibition of the execution of the external charging promotion control can be suppressed.

Fifth Embodiment

In the above-described first embodiment, in the case where the demanded electric power at the destination is higher than the threshold (the case where the degree of the tightness in the electricity supply-demand balance at the destination is higher than the reference level), the external charging promotion control is prohibited.

Meanwhile, in this fifth embodiment, in the cases where the demanded electric power at the destination is higher than the threshold and where the remaining amount of the fuel for the engine 16A is larger than the specified value, the external charging promotion control is prohibited. Because the other configurations, functions, and processing are the same as those in the above-described first embodiment, the detailed description thereon will not be made herein.

FIG. 8 is a flowchart of one example of a processing procedure at a time when the electronic control unit 19 of the host vehicle 11 according to this fifth embodiment decides whether to permit the external charging promotion control. Here, the description has already been made on steps that are shown in FIG. 8 and denoted by the same reference numbers as the above-described steps shown in FIG. 4. Thus, the detailed description thereon will not be made herein.

If it is determined that the demanded electric power, which is received from the cloud server 30, is higher than the threshold (YES in step S14), the electronic control unit 19 determines whether the remaining amount of the fuel for the engine 16A is larger than the specified value (step S33). The remaining amount of the fuel for the engine 16A is detected by the sensor, which is not shown, for example.

Then, if it is determined that the remaining amount of the fuel is larger than the specified value (YES in step S33), the electronic control unit 19 prohibits the execution of the external charging promotion control (step S18). On the other hand, if it is not determined that the remaining amount of the fuel is larger than the specified value (NO in step S33), the electronic control unit 19 permits the execution of the external charging promotion control (step S16).

As it has been described so far, in this fifth embodiment, in the cases where the demanded electric power at the destination is higher than the threshold (the case where the degree of the tightness in the electricity supply-demand balance at the destination is higher than the reference level) and where the remaining amount of the fuel for the engine 16A is larger than the specified value, the execution of the external charging promotion control is prohibited. In this way, the execution of the external charging promotion control can be prohibited in a situation where the electricity supply-demand balance is tight, the remaining amount of the fuel is large, and the urgency of the external charging is low.

Meanwhile, even in the case where the demanded electric power at the destination is higher than the threshold, the execution of the external charging promotion control is permitted when the remaining amount of the fuel for the engine 16A is smaller than the specified value. In this way, the prohibition of the execution of the external charging promotion control can be suppressed in a situation where the remaining amount of the fuel is small and the urgency of the external charging is high.

It should be understood that the embodiments disclosed herein are illustrative in all respects and not restrictive. The scope of the present disclosure is defined by the claims rather than the above description, and intends to include all modifications falling within the claims and equivalents thereof.

What is claimed is:

1. An electrically-driven vehicle configured to be connected to a power feeding device on the outside of the electrically-driven vehicle, the electrically-driven vehicle comprising:
   a rotary electric machine;
   an electric power storage device configured to store electric power that is used to drive the rotary electric machine;
   a communication device configured to communicate with a server on the outside of the electrically-driven vehicle; and
   an electronic control unit configured to control external charging in which the electric power storage device is charged by using the electric power that is supplied from the power feeding device,
   the electronic control unit being configured to acquire information from the server, the information indicating a degree of tightness of electricity supply-demand balance at a destination of the electrically-driven vehicle, and
   the electronic control unit being configured to prohibit execution of charging promotion control for urging a user to perform the external charging at the destination when the acquired information indicates that the degree of the tightness is higher than a reference level.

2. The electrically-driven vehicle according to claim 1, wherein
   the electrically-driven vehicle is a hybrid vehicle that travels by using power of at least one of the rotary electric machine and an engine, and
   the electronic control unit is configured to change the reference level by using at least one of a degree of degradation of fuel for the engine, moisture content of a lubricant in the engine, and a remaining amount of the fuel for the engine.

3. The electrically-driven vehicle according to claim 1, wherein
   the electrically-driven vehicle is a hybrid vehicle that travels by using power of at least one of the rotary electric machine and an engine, and
   the electronic control unit is configured to prohibit the execution of the charging promotion control when the acquired degree of the tightness is higher than the reference level and degree of degradation of fuel for the engine is higher than a specified value.

4. The electrically-driven vehicle according to claim 1, wherein
the electrically-driven vehicle is a hybrid vehicle that travels by using power of at least one of the rotary electric machine and an engine, and
the electronic control unit is configured to prohibit the execution of the charging promotion control when the acquired degree of the tightness is higher than the reference level and moisture content of lubricant in the engine is higher than a specified value.

5. The electrically-driven vehicle according to claim 1, wherein
the electrically-driven vehicle is a hybrid vehicle that travels by using power of at least one of the rotary electric machine and an engine, and
the electronic control unit is configured to prohibit the execution of the charging promotion control when the acquired degree of the tightness is higher than the reference level and remaining amount of fuel for the engine is larger than a specified value.

6. A control method for an electrically-driven vehicle that is configured to be connected to a power feeding device on the outside of the electrically-driven vehicle, the electrically-driven vehicle including a rotary electric machine, an electric power storage device, a communication device, and an electronic control unit, the electric power storage device being configured to store electric power that is used to drive the rotary electric machine, and the communication device being configured to communicate with a server on the outside of the electrically-driven vehicle, the control method comprising:
controlling, by the electronic control unit, external charging in which the electric power storage device is charged by using the electric power that is supplied from the power feeding device;
acquiring, by the electronic control unit, information from the server, the information indicating a degree of tightness of electricity supply-demand balance at a destination of the electrically-driven vehicle; and
prohibiting, by the electronic control unit, execution of charging promotion control for urging a user to perform the external charging at the destination when the acquired information indicates that the degree of the tightness is higher than a reference level.

* * * * *